(12) United States Patent
Bessho et al.

(10) Patent No.: US 6,285,649 B1
(45) Date of Patent: Sep. 4, 2001

(54) DISC PLAYER HAVING IMPROVED OPTICAL AXIS ADJUSTING SYSTEM

(75) Inventors: Akira Bessho; Tomonari Ishikawa, both of Saitama-ken (JP)

(73) Assignee: Pioneer Electronic Corporation, Tokyo (JP)

(*) Notice: Subject to any disclaimer, the term of this patent is extended or adjusted under 35 U.S.C. 154(b) by 0 days.

(21) Appl. No.: 09/362,569

(22) Filed: Jul. 28, 1999

(30) Foreign Application Priority Data

Aug. 5, 1998 (JP) .................................................. 10-222009

(51) Int. Cl.[7] ............................. G11B 17/30; G11B 21/02
(52) U.S. Cl. ............................. 369/219; 369/215; 369/249
(58) Field of Search .................................... 369/219, 215, 369/249

(56) References Cited

U.S. PATENT DOCUMENTS

| | | | |
|---|---|---|---|
| 5,111,088 | 5/1992 | Fujino | 369/219 |
| 5,375,115 * | 12/1994 | Shimegi et al. | 369/244 |
| 5,761,182 * | 6/1998 | Jeon | 369/219 |
| 5,764,618 * | 6/1998 | Kim | 369/219 |
| 5,995,478 * | 11/1999 | Park | 369/219 |

OTHER PUBLICATIONS

Abstract of Japanese Patent Publication No. 11025466, dated Jan. 29, 1999.

* cited by examiner

Primary Examiner—David Davis
(74) Attorney, Agent, or Firm—Arent Fox Kintner Plotkin & Kahn, PLLC (57) ABSTRACT

A disc player includes an optical pickup for producing a laser beam onto an optical disc which is being rotated by virtue of a spindle motor. Two guide shafts are disposed on opposite sides of the optical pickup for guiding the movement of said optical pickup. An adjusting system adjusts the position of each guide shaft. The spindle motor is fixed on a motor base plate which forms part of the adjusting system.

7 Claims, 8 Drawing Sheets

DISC PLAYER HAVING IMPROVED OPTICAL AXIS ADJUSTING SYSTEM

BACKGROUND OF THE INVENTION

The present invention relates to a disc player, particularly to a compatible disc player capable of recording information on or reproducing information from DVD (digital video disc) and CD (compact disc).

A conventional compatible disc player comprises a driving system (using a spindle motor) for rotatably driving an optical disc, a servo mechanism mounting an optical pickup, both of which are arranged independently from each other on a base frame of the player.

The servo mechanism is movably connected with two mutually parallel guide shafts arranged on the base frame in a manner such that the center of the optical pickup may move along a trace coincident with a straight line passing through the center of an optical disc mounted on a turntable.

The optical pickup (two-focus optical pickup) is mounted on the servo mechanism. A driving motor is provided for reciprocatingly driving the servo mechanism through a group of driving force transmitting gears.

The optical pickup is fabricated so that when in use a laser beam emitted from a laser diode is allowed to pass through an objective lens and converged on to an optical disc so as to record information on the disc. Further, the optical pickup is also fabricated so that when in use a laser beam is allowed to irradiate an optical disc, a light beam reflected from the optical disc is permitted to pass through the objective lens to arrive at a photo-detector provided within the optical pickup, so as to reproduce information previously recorded on the optical disc. However, to ensure proper information recording and reproducing, it is extremely important to perform adjustments (tangential adjustment and radial adjustment) on the optical axis of the optical pickup, corresponding to a possible inclination of the optical disc mounted on the turntable.

For the above reason, an automatic optical axis adjusting device having a step motor is used to adjust the optical axis of an optical pickup. In detail, an upper chassis is mounted on the base frame. Between the upper chassis and the base frame is provided an optical axis adjusting device having adjustment screws capable of raising and lowering end portions of the guide shafts by virtue of the step motor. In this way, it is possible to adjust the optical axis of an optical pickup by raising or lowering the end portions of the guide shafts.

However, there are at least the following problems associated with the above-discussed conventional compatible disc player. Namely, since the driving system, the servo mechanism, and the base frame are arranged independently from one another, it is difficult to manufacture the disc player compact in size. Moreover, due to the above-discussed structure of the conventional compatible disc player, there are too many parts and elements forming the player, resulting in a high cost in manufacturing a compatible disc player.

SUMMARY OF THE INVENTION

It is an object of the present invention to provide a disc player having an improved optical axis adjusting system for adjusting the optical axis of an optical pickup, rendering the player to be manufactured with a reduced size using fewer parts and elements, thereby solving the above-mentioned problems peculiar to the above-discussed prior art.

According to the present invention, there is provided a disc player, comprising: an optical pickup for producing a laser beam onto an optical disc which is being rotated by virtue of a spindle motor; two guide shafts disposed on opposite sides of the optical pickup for guiding the movement of said optical pickup; and adjusting means for adjusting the position of each guide shaft. In particular, the spindle motor is fixed on a chassis which forms part of the adjusting means.

In one aspect of the present invention, the spindle motor is disposed on the inner side of the chassis, which is opposite to the outer side thereof where a turntable is provided for mounting an optical disc.

In another aspect of the present invention, the adjusting means includes a plurality of cylindrical holders and the same number of adjustment screws to be engaged into the cylindrical holders, further includes urging means provided in each cylindrical holder for urging end portion of each guide shaft in a predetermined direction.

In further aspect of the present invention, the chassis forms end walls for the cylindrical holders.

In a still further aspect of the present invention, the urging means includes a plurality of leaf springs each serving as one wall for each cylindrical holder.

In one more aspect of the present invention, the urging means includes a plurality of adjustment screws each having a sharp front end adapted to press against an outer periphery surface of a guide shaft.

The above objects and features of the present invention will become better understood from the following description with reference to the accompanying drawings.

DETAILED DESCRIPTION OF THE PREFERRED EMBODIMENTS

Figure 1:
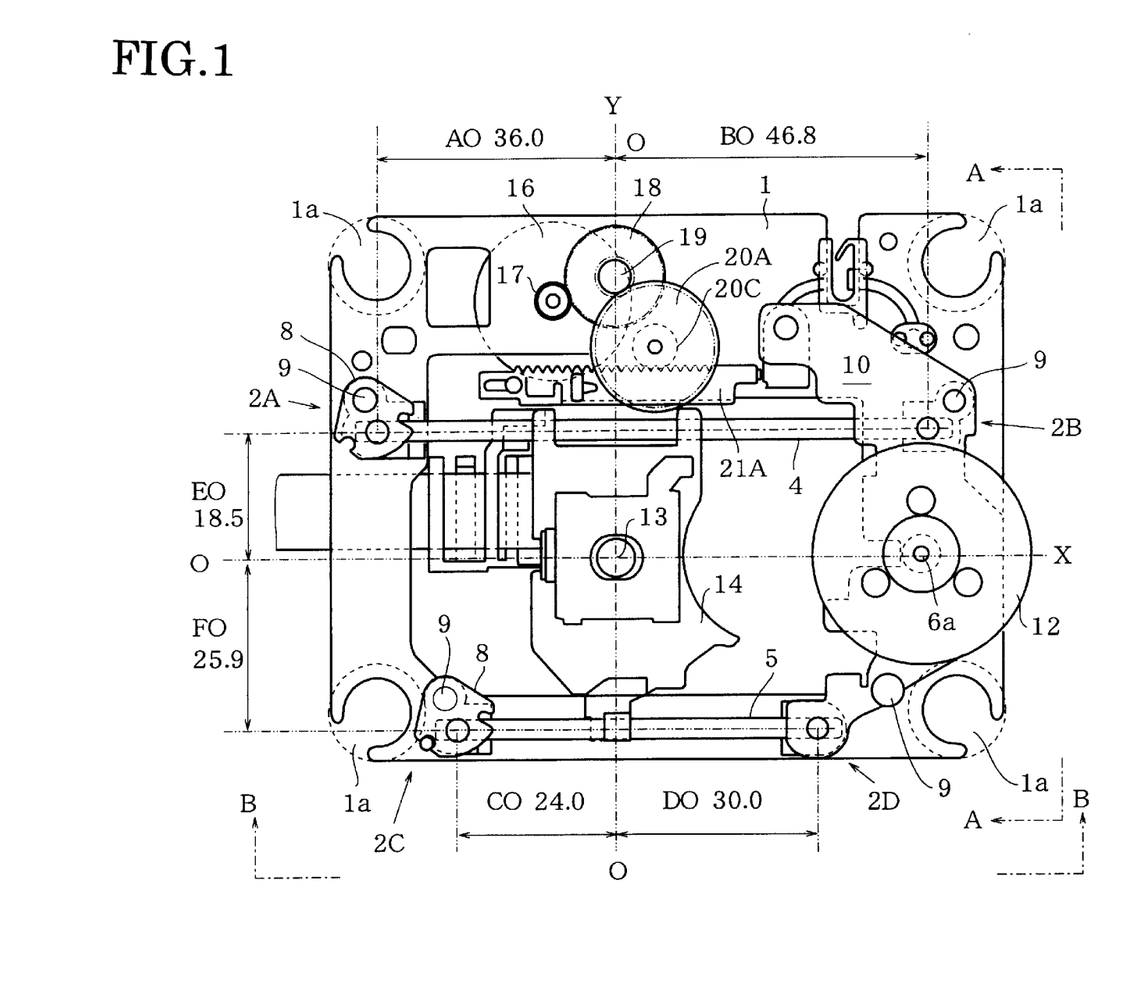
FIG. 1 is a front view indicating an internal structure of a disc player made according to the present invention.

FIG. 1 is a front view indicating an internal structure of a disc player made according to the present invention.

Figure 2:
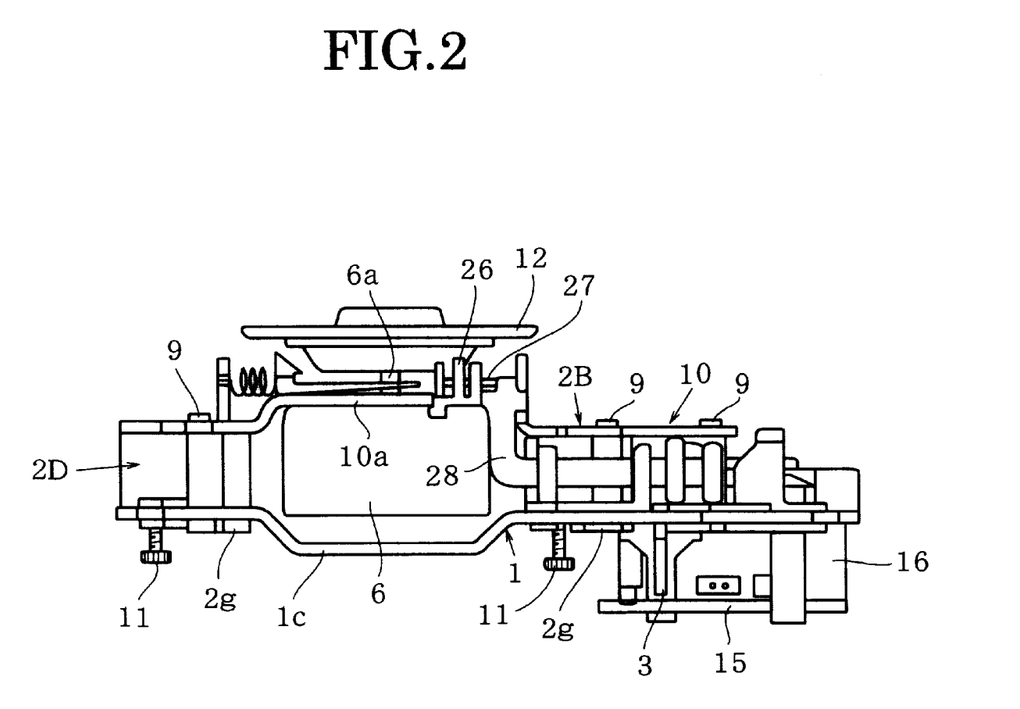
FIG. 2 is an end view seen in a direction shown by arrows A, A in FIG. 1.

FIG. 2 is an end view seen in a direction shown by arrows A, A in FIG. 1. FIG. 3A is a side view seen in a direction shown by arrows B, B in FIG. 1.

Figure 3:
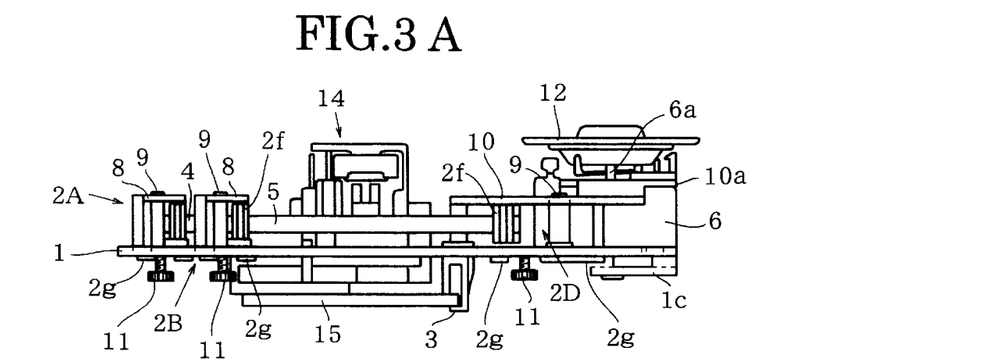
FIG. 3A is a side view seen in a direction shown by arrows B, B in FIG. 1.
FIGS. 3B–3E are sectional views indicating adjusting means for adjusting attachment position of guide shaft.

Referring to FIG. 1, a disc player of the present invention includes a base frame 1 having a generally square configuration. Formed on the four corners of the base frame 1 are four installing holes 1a which are used for fixing (through vibration proof elements) the base frame 1 in position within the disc player. Further, cylindrical holders 2A, 2B, 2C and 2D forming important portions of optical axis adjusting means are formed on the base frame 1. Moreover, as shown in FIGS. 2 and 3, a support member 3 supporting a base plate 15 is formed on the base frame 1.

In practice, the cylindrical holders 2A–2D may be formed by tightly attaching metal molds (for forming the holders 2A–2D) on both the upper side and lower side of the base frame 1, followed by injecting a liquid resin into the metal molds and hardening the resin.

In detail, the positions for forming the holders 2A–2D on the base frame 1 are required to satisfy a relationship between a step motor rotating amount and a guide shaft length, in a manner such that the longitudinal directions of guide shafts 4 and 5 are parallel to a straight line passing through the rotating center of the spindle motor 6.

FIG. 3B is used to illustrate the structure of each of the holders 2A–2D. As shown in FIG. 3B, each of the holders 2A–2D standing on the base frame structure 1 is formed into a cylindrical shape, with an opening 2e formed on the upper side thereof. The end portions of the guide shafts 4 and 5 are received through the openings 2e into the holders 2A–2D and supported therein. Further, a guide portion 2f is formed in the opening 2e of each holder, in a manner such that an end portion of the guide shaft 4 or 5 is slidable along the guide portion 2f.

Further, a screw spring 7 is disposed in the opening 2e of each of the holders 2A–2D to press against an end of the guide shaft 4 or 5. In detail, each screw spring 7 is so arranged that its smaller portion is located on the upper side within the opening 2e. As shown in FIG. 3B, open portions of the holders 2A and 2C are covered up by a cover plate 8, followed by fixing screws 9 through the holes formed on the plate 8, thereby fixing the cover plate 8 on the holders 2A and 2C. In this way, one end of each of the guide shafts 4 and 5 is urged downwardly. On the other hand, open portions of the holders 2B and 2D are covered up by a motor base plate 10 having a projection 10a, followed by fixing screws 9 through the holes formed on the motor base plate 10, thereby fixing the motor base plate 10 on the holders 2B and 2D. In this way, the other end of each of the guide shafts 4 and 5 is urged downwardly (FIGS. 1–3).

Figure 4:
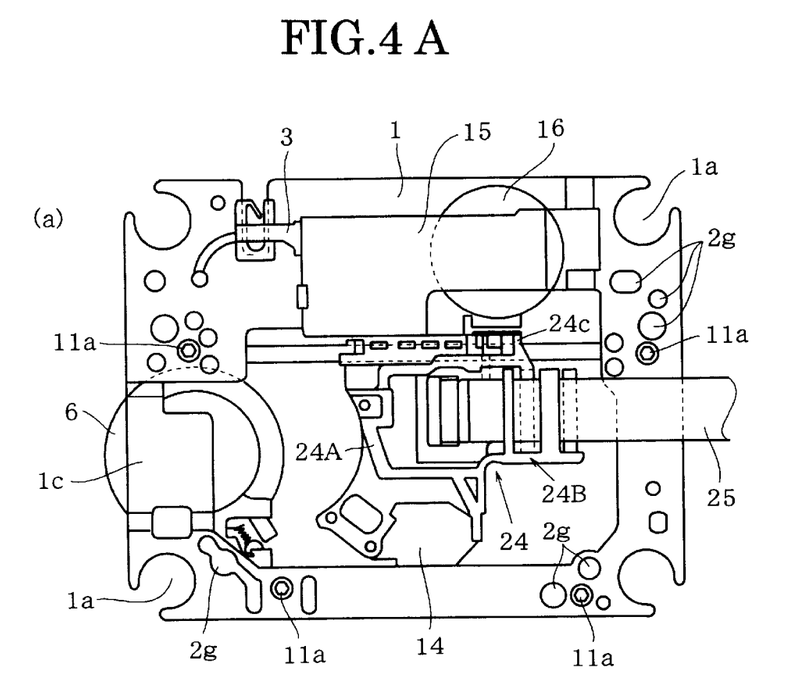
FIGS. 4A and 4B are bottom views indicating the bottom structure of the disc player of FIG. 1.

Further, on the base frame 1 obturating the bottoms of the holders 2A–2D, there are formed holes 1b which allow passing of adjustment screws 11 therethrough from below the base frame 1, so that the adjustment screws 11 may be inserted into the holes 1b. Here, each of the screws 11 is formed with a hexagonal recess portion 11a (FIG. 4) on the head thereof. Jigs of an automatic optical axis adjusting device (not shown) are allowed to engage into the hexagonal recess portions 11a, so that the screws 11 may be screwed into the through holes 1b by virtue of a driving force from a step motor (not shown). In this way, the front end of each screw 11 will get in contact with the lower surface of an end portion (received in one of the holders 2A–2D) of a guide shaft 4 or 5. Thus, with the rotation of the step motor of the automatic optical axis adjusting device, the screws 11 may be rotated so as to move up or down, thereby adjusting the position of an end portion of (received in one of the holders 2A–2D) of a guide shaft 4 or 5.

Moreover, referring to FIGS. 2–4, each of the holders 2A–2D is integrally formed with a retaining member 2g which is located on the underside of the base frame 1 for preventing a potential moving away of a holder from its installing position.

Referring to FIG. 2, the projection 10a of the motor base plate 10 is located on the center thereof and is protruding upwardly. On the other hand, the base frame 1 is formed with a recess portion 1c protruding downwardly, in a manner such that the recess portion 1c is facing the upwardly protruding portion 10a. Therefore, a spindle motor 6 is allowed to be located in a space formed between the upwardly protruding portion 10a and the downwardly protruding portion 10c. In detail, the spindle motor 6 is hung on the inner surface of the upwardly protruding port ion 10a. In this way, the spindle shaft 6a of the spindle motor 6 is allowed to protrude from the upper surface of the upwardly protruding portion 10a, a turntable 12 having a circular shape is mounted on the spindle shaft 6a.

The guide shafts 4 and 5 are each formed into an elongated rod having a circular cross section, so that a servo mechanism 14 mounting the optical pickup 13 may be slidably mounted on the shafts 4, 5 to be slidable therealong.

In fact, the guide shaft 4 is longer than the guide shaft 5 and can serve as a bearing for slidingly moving the servo mechanism 14. The guide shaft 5, which is shorter than the guide shaft 4, is used to guide the servo mechanism 14 as it slides.

As related in the above, the holders 2A–2D are provided to serve as adjusting means for adjusting the optical axis of the optical pickup 13. A relationship between a rotating amount of the step motor and an adjusting amount of the screws 11 is determined by some predetermined values (step motor: 3600 pulse/rev; screw pitch: 0.45 (M2.6); screw moving amount: 0.125 $\mu$m/pulse). In particular, when the shaft 4 and the shaft 5 have different lengths from each other, positions for disposing the holders 2A–2D on the base frame 1 are required to satisfy the following relationship involving a step motor rotating amount and a guide shaft length.

At first, the tens center of the optical pickup 13 mounted on the servo mechanism 14 is assumed to be a reference point, a distance between the center of each of the holders 2A–2D and each of X axis and Y axis (see FIG. 1) is indicated In FIG. 1. For the sake of convenience, distances in the direction of X axis are defined as A0, B0, C0, D0, while the distances in the direction of Y axis are defined as E0 and F0.

In more detail, a distance A0 between the lens center O of the optical pickup 13 and the adjustment center of the holder 2A in the direction of X axis is 36.0 mm.

A distance B0 between the lens center O of the optical pickup 13 and the adjustment center of the holder 2B in the direction of X axis is 46.8 mm.

A distance C0 between the lens center O of the optical pickup 13 and the adjustment center of the holder 2C in the direction of X axis is 24.0 mm.

A distance D0 between the lens center O of the optical pickup 13 and the adjustment center of the holder 2D in the direction of X axis is 30.0 mm.

A distance between the lens center O of the optical pickup 13 and the adjustment centers of the holder 2A, 2B in the direction of Y axis is 18.5 mm.

A distance between the lens center O of the optical pickup 13 and the adjustment centers of the holder 2C, 2D in the direction of Y axis is 25.9 mm.

Referring to FIGS. 1–4, a driving system for slidably driving the servo mechanism 14 comprises: 1) a driving motor 16 mounted on a base plate 15 which is supported by a support member 3 positioned on the underside of the base frame 1; 2) a driving gear 17 attached at the front end of the driving shaft of the driving motor 16, said driving gear 17 being provided on the base frame 1; 3) a reduction gear 18 engaged with the driving gear 17, said reduction gear 18 being rotatably supported on the base frame 1; 4) a small gear 19 formed coaxially and integrally with the reduction gear 18; 5) a pair of gears 20A and 20B (overlapped one upon the other) both of which are rotatably supported on the base frame 1 and engaged with the small gear 19; 6) an intermediary gear 20C formed coaxially and integrally with the gear 20B on one side thereof; 7) racks 21A and 21B movably attached on the guide shaft 4, both engaged with the intermediary gear 20C.

Figure 5:
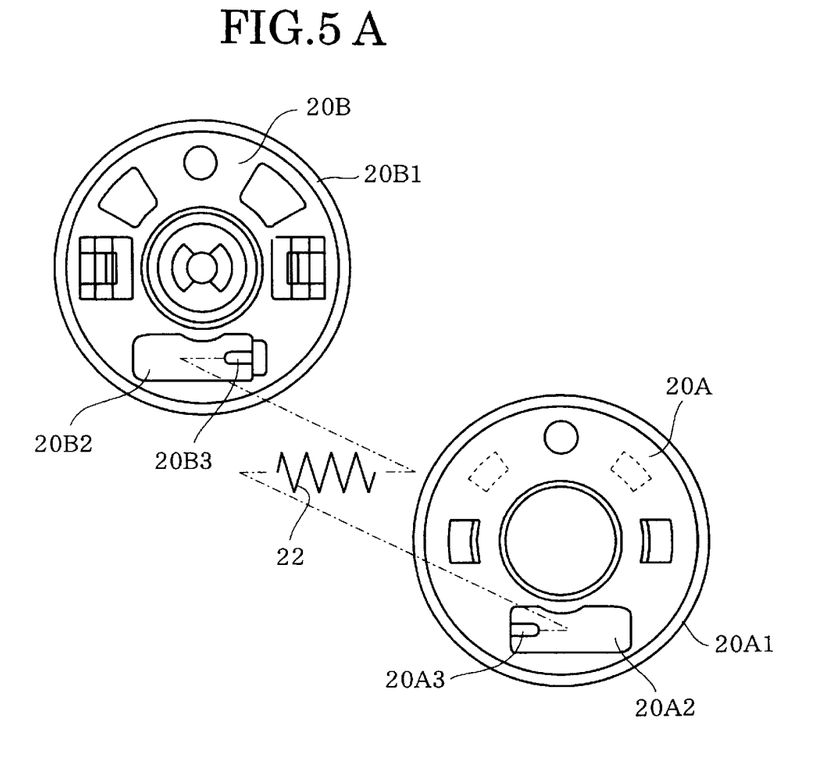
FIG. 5A is a front view indicating a gear assembly for use in the disc player of FIG. 1.
FIG. 5B is an exploded cross sectional view indicating the gear assembly of FIG. 5A.

As shown in FIGS. 5A and 5B, the pair of gears 20A and 20B have circumferential tooth portions 20A1 and 20B1, and are coaxially overlapped one upon the other. The gear 20A is formed with an opening 20A2 and is provided with a pin 20A3 protruding from one wall of the opening 20A2. Similarly, the gear 20B is formed with an opening 20B2 and is provided with a pin 20B3 protruding from one wall of the opening 20B2 in a direction opposite to the pin 20A3.

The intermediary gear 20C is disposed below the gear 20B and is rotatably supported on the base frame 1. The gear 20A is disposed over the gear 20B. A coil spring 22 is disposed between the mutually protruding pins 20A3 and 20B3, thereby rendering the gears 20A and 20B to be urged in mutually opposite directions. In this way, both the gears 20A and 20B are allowed to be exactly engaged with the small gear 19, preventing potential clatterring between the tooth portions 20A1, 20B1 of the gears 20A and 20B on one hand and the tooth portion of the small gear 19 on the other.

Figure 6:
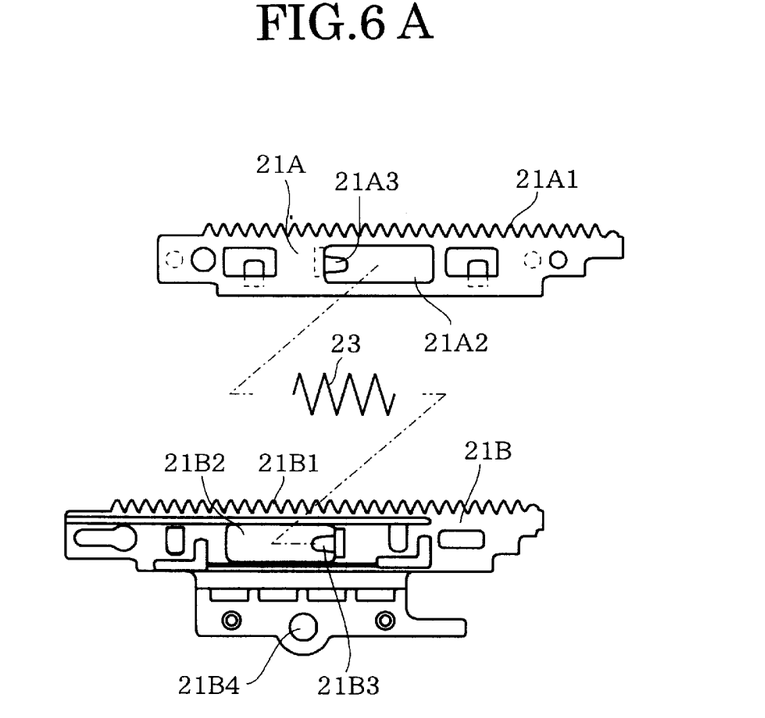
FIG. 6A is a front view indicating a rack assembly for use in the disc player of FIG. 1.
FIG. 6B is an exploded side view indicating the rack assembly of FIG. 6A.

On the other hand, as shown in FIG. 6, the disc player has a pair of racks 21A, 21B including tooth portions 21A1, 21B1. The rack 21A is formed with a hole 21A2 having a pin 21A3 protruding from one wall thereof. Similarly, the rack 21B is formed with a hole 21B2 having a pin 21B3 protruding from one wall thereof in a direction opposite to the pin 21A3. A coil spring 23 is disposed between the mutually protruding pins 21A3 and 21B3, thereby rendering the racks 21A and 21B to be urged in mutually opposite directions. In this way, even when the adjustment screws 11 are screw-drived to vertically displace the end portions of the guide shafts 4 and 5, it is possible to prevent any potential clatterring between the tooth portions 21A1, 21B1 of the racks 21A, 21B on one hand and the intermediary gear 20C on the other, thereby enabling the servo mechanism 14 to smoothly and stably move along the guide shafts 4, 5 in a correct manner.

In FIG. 6A, reference numeral 21B4 is used to represent a screw hole for installing the servo mechanism 14.

Referring again to FIG. 4, a flexible holder 24 is attached on the underside of the servo mechanism 14 for connecting a flexible flat belt-like wire assembly 25 including a plurality of wires.

Figure 7:
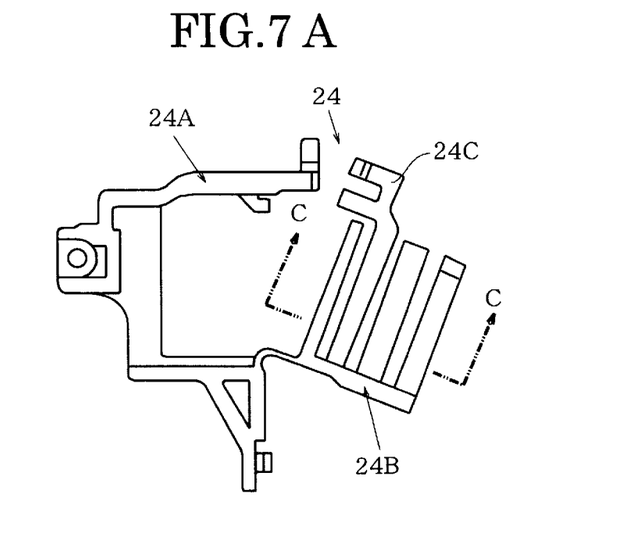
FIG. 7A is a front view indicating a flexible holder for use in the disc player of FIG. 1.
FIG. 7B is a sectional view taken along a line C—C in FIG. 7A.
FIGS. 7C and 7D are sectional views indicating how a flexible wire assembly is inserted through the flexible holder of FIG. 7A.

In detail, as shown in FIG. 7, the flexible holder 24 is made of a flexible resin material such as polypropylene resin, including a main body 24A directly attached to the servo mechanism 14, a comb-like wire insertion portion 24B, and a connecting portion 24C. Therefore, the flexible belt-like wire assembly 25 extending from the servo mechanism 14 to outside connector terminals is allowed to be pulled out in either direction in which the servo mechanism 14 moves. Accordingly, after the flexible belt-like wire assembly 25 has been inserted through the insertion portion 24B in accordance with a course shown in FIG. 7C or FIG. 7D, the connecting portion 24C shall be connected to the main body 24A.

Figure 8:
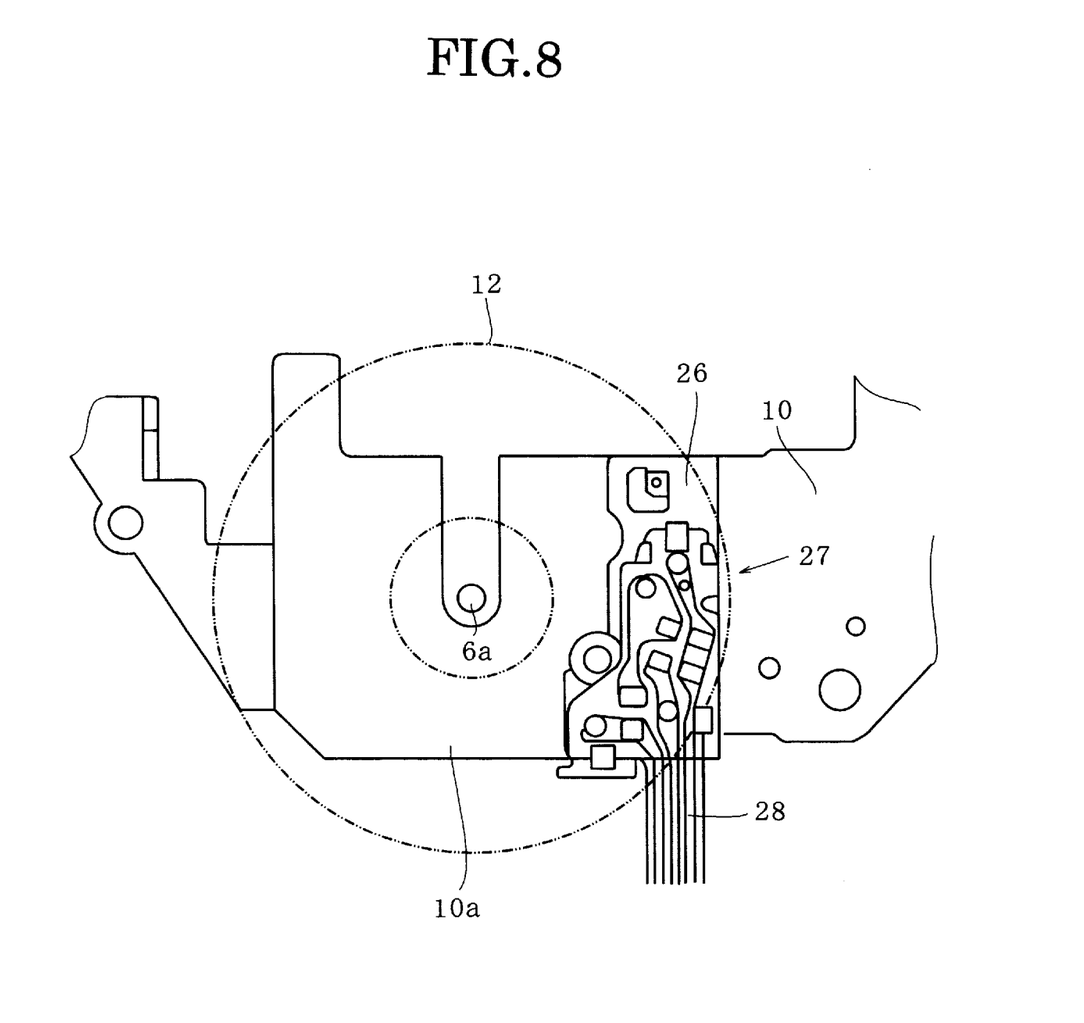
FIG. 8 is an explanatory view indicating a condition where a rotation pulse detector has been attached to a motor base in the disc player of FIG. 1.

Referring to FIGS. 2 and 8, a detector holder 26 made of a synthetic resin is installed on the upper surface of the projection 10a of the motor base 10. A detector 27 for detecting rotation pulse of the disc turntable 12 is attached on the detector holder 26. The detector 27 is so formed that it can be used to attach front ends of flexible wires 28 directly onto the detector holder 26, thereby making it sure to dispense with the use of a print substrate.

The operation for the optical axis adjustment for the disc player of the present invention will be described in the following, with reference to FIG. 1.

Here, the optical axis of the objective lens of the optical pickup 13 mounted on the servo mechanism 14 will be adjusted in a direction of X axis in FIG. 1.

At first, the servo mechanism 14 is set on an automatic optical axis adjusting device (not shown). Then, the step motor is operated to screw-drive the adjustment screw 11 engaged in the holder 2C so as to raise the screw 11 by 20 pulses. At this moment, distances between the lens center O and the holders 2C, 2D in the direction of X axis may be indicated as follows.

$$C0:D0=24.0:30.0=1:1.25$$

In this way, in order not to change the height of the objective lens, the step motor is operated to screw-drive the adjustment screw 11 engaged in the holder 2D so as to lower the screw 11 by 25 pulses. At this moment, distances between the lens center O and the holders 2A, 2B in the direction of X axis may be indicated as follows.

$$A0:B0=36.0:46.8=1.5:1.95$$

Therefore, in order to keep the guide shafts 5 and 4 in parallel to each other, the step motor is operated to screw-drive the adjustment screw 11 engaged in the holder 2A so as to raise the screw 11 by 30 pulses. Meanwhile, the step motor is operated to screw-drive the adjustment screw 11 engaged in the holder 2B so as to lower the screw 11 by 30 pulses.

In this way, with the use of the automatic optical axis adjusting device, the optical axis of the objective lens of the optical pickup 13 may be adjusted by being tilted in a direction of X axis in FIG. 1, while keeping the guide shafts 4, 5 parallel to each other all the time, thereby finishing the adjustment of the optical axis in the direction of X axis.

Further, the optical axis of the objective lens of the optical pickup 13 mounted on the servo mechanism 14 will be adjusted in a direction of Y axis in FIG. 1.

At the first, the step motor is operated to screw-drive two adjustment screws 11 engaged in the holders 2C and 2D so as to lower the two screws 11 by 7 pulses. At this moment, distances between the lens center O and the holders 2A, 2B, 2C, 2D in the direction of Y axis may be indicated as follows.

$$E0:F0=18.5:25.9=1:1.4$$

In this way, in order not to change the height of the objective lens, the step motor is operated to screw-drive the other two adjustment screws 11 engaged in the holders 2A and 2B, so as to raise the two screws 11 by 5 pulses.

Thus, with the use of the automatic optical axis adjusting device, the optical axis of the objective lens of the optical pickup 13 may be adjusted by being tilted in a direction of Y axis in FIG. 1, while keeping the guide shafts 4, 5 parallel to each other all the time, thereby finishing the adjustment of the optical axis in the direction of Y axis.

An internal deformation within each of the holders 2A–2D is shown in FIG. 3D. Referring to FIG. 3D, one wall 2' of each holder is formed into a leaf spring, so that an end portion of a guide shaft 4 or 5 may be urged toward an opposite wall in a direction shown by an arrow α in FIG. 3D, thereby preventing any potential clatterring within each of the holder 2A–2D.

FIG. 3E is used to illustrate a further embodiment of the present invention using an adjustment screw 11 having a sharp front end. As shown in FIG. 3E, with the use of the adjustment screw 11 having a sharp front end, even if there is an unnecessary space formed between a guide shaft 4 or 5 and one wall 2" of a holder, an end portion of a guide shaft 4 or 5 may be urged toward an opposite wall in a direction shown by an arrow β in FIG. 3E, thereby preventing any potential clatterring within each of the holder 2A–2D.

With the use of the present invention, even if the guide shafts 4 and 5 have different lengths, it is still possible that the optical axis of the objective lens of the optical pickup 13 mounted on the servo mechanism 14 may be easily adjusted in both X direction and Y direction (shown in FIG. 1) with an improved precision, thereby greatly reducing a time period necessary for the adjustment of the optical axis of the objective lens.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A disc player, comprising:

an optical pickup for producing a laser beam onto an optical disc which is being rotated by virtue of a spindle motor:

two guide shafts disposed on opposite sides of the optical pickup for guiding the movement of said optical pickup; and a plurality of adjusters for adjusting positions of the guide shafts, wherein the spindle motor is operatively connected to a motor base plate which partially forms the adjusters and is disposed between the motor base plate and a base frame, wherein one surface of the motor base plate, on which the motor is operatively connected, partially forms the adjusters for adjusting the positions of the guide shafts, said one surface being parallel to a surface of an optical disc mounted on a turntable.

2. The disc player according to claim 1, wherein the spindle motor is disposed on an inner side of the motor base plate, which is opposite to an outer side thereof where the turntable is provided for mounting an optical disc.

3. The disc player according to claim 1, wherein each adjuster includes a cylindrical holder and an adjustment screw to be engaged in the cylindrical holder, further including an urging element provided in the cylindrical holder for urging an end portion of the guide shaft in a predetermined direction.

4. The disc player according to claim 3, wherein each adjustment screw has a sharp front end adapted to press against an outer periphery surface of a guide shaft.

5. The disc player according to claim 1, wherein each adjuster also includes a leaf spring serving as one wall for the cylindrical holder.

6. The disc player according to claim 1, wherein one guide shaft is longer than the other guide shaft for serving as a bearing for slidingly moving a servo mechanism.

7. The disc player according to claim 1, wherein the two guide shafts are elongated rods having a circular cross section.

* * * * *